United States Patent Office 3,842,137
Patented Oct. 15, 1974

3,842,137
SELECTIVE HYDROGENATION OF C₄ ACETYLENIC HYDROCARBONS
Roland Libers, Dickinson, and Claude W. Smalling, Jr., Alvin, Tex., assignors to Monsanto Company, St. Louis, Mo.
No Drawing. Filed Jan. 2, 1973, Ser. No. 320,431
Int. Cl. C07c 7/00
U.S. Cl. 260—681.5 R                10 Claims

ABSTRACT OF THE DISCLOSURE

Selective hydrogenation of $C_4$ acetylenes in admixture with other $C_4$ hydrocarbons including butadiene by liquid phase hydrogenation over Group VIII noble metal catalyst in which a hydrogen stream diluted to not more than 25 mole percent hydrogen in inert gas is employed as a sole source of hydrogen.

FIELD OF INVENTION

This invention relates to removing $C_4$-acetylenes from admixture with substantial quantities of butadiene and other $C_4$ hydrocarbons with minimum loss of butadiene by hydrogenation.

BACKGROUND OF THE INVENTION

Butadiene, also sometimes referred to as vinyl ethylene, is derived in large quantities from dehydrogenation of butanes and butenes, as well as from various petroleum refining off-gases and from the gaseous products recovered from hydrocarbon cracking operations. Irrespective of the source of the butadiene recovered it is seldom obtained in the degree of purity required for certain of its uses in the preparation of other organic compounds. Certain impurities which are particularly difficult to separate by the usual fractional distillation techniques are the highly unsaturated acetylenes in the $C_4$ fraction, namely vinyl acetylene, ethyl acetylene and methyl acetylene, referred to hereinafter as $C_4$-acetylenes. Therefore, it has been the practice to hydrogenate the $C_4$ stream containing butadiene and the more highly unsaturated $C_4$-acetylenes, either before or after separation of the more easily separated butanes and butenes therefrom. Such catalytic hydrogenation processes have been carried out either in the vapor or liquid phase and over various hydrogenation catalysts. However, when carried out in either vapor or liquid phase such hydrogenations have resulted in losses of the desired butadiene product by hydrogenation and/or polymerization thereof. In vapor phase at relatively high temperatures of greater than 300° F. there are significant losses to polymerization of butadiene. In liquid phase the necessity to hydrogenate essentially all vinyl acetylene which requires relatively large amounts of hydrogen gas in molar excess of vinyl acetylene has resulted in significant losses of butadiene by hydrogenation to mono-olefins. Consequently, there have been sugested to the art many specific selective catalysts for increased hydrogenation of the $C_4$-acetylenes with decreased loss through hydrogenation of butadiene. Among the best of such selective catalysts which have been proposed for this use are the noble metals of Group VIII supported on various supports, including alumina, and with or without other metals or their salts as co-catalytic metals.

SUMMARY OF THE INVENTION

It has now been found that the losses of desirable butadiene can be minimized when removing $C_4$-acetylenes by catalytic hydrogenation in upflow liquid phase over supported Group VIII noble metal catalysts if the hydrogen stream used to supply the hydrogen required for hydrogenation of the $C_4$-acetylenes is diluted by an inert gas to a hydrogen content of not more than twenty-five mole percent. The liquid phase catalytic hydrogenation process can be carried out under otherwise more or less conventional reaction conditions.

DETAILED EMBODIMENTS OF THE INVENTION

In the conduct of liquid phase hydrogenation reactions of $C_4$-acetylenes there are several different reactor configurations which have been employed. One of these prior reactors was a downflow or "trickle phase" packed reactor. It has been found that the improved selectivity of the present invention is realized when the $C_4$ stream and gas feed are contacted in an upflow packed reactor.

Certain variables affect the severity of hydrogenation and consequently the losses of desired butadiene along with the hydrogenation of the undesired $C_4$-acetylenes. Avoidance of very high temperatures in the reaction is important. The process of this invention can be carried out at temperatures of from 40° to 175° F. Temperatures higher than 150° F. are generally to be avoided because of increased losses of butadiene due to polymerization and rapid catalyst deactivation. However, the process is relatively insensitive to temperature changes below about 140° F. The most preferred temperature conditions for conduct of the improved process are from 70° to 140° F. The pressure under which the reaction is conducted must be sufficient to maintain the $C_4$ hydrobarbons in liquid phase, but does not otherwise critically affect the process. Thus, the pressure may range from about 40 to about 300 p.s.i.g. The preferred pressure is generally between about 80 and 200 p.s.i.g. The weight hourly space velocity of the liquid $C_4$ hydrocarbons is less than about 50 and preferably within the range of 2 to 35.

In accordance with the invention the hydrogen required for the hydrogenation of the $C_4$-acetylene is supplied in gaseous form as a mixture with inert gas or gases containing not more than 25 mole percent of hydrogen. Preferably the hydrogen gas stream contains from about 2 to about 20 mole percent hydrogen. The stream of hydrogen and inert gas is supplied to the reactor in an amount to insure the presence of free gas bubbles in the $C_4$ hydrocarbon stream being hydrogenated. Any gas inert to the hydrogenation reaction and not acting as a catalyst poison may be used to dilute the hydrogen feed stream. Thus, there can be used such gases as helium, neon, argon, nitrogen, ethane and methane or mixtures of such gases. Due to their ready availability nitrogen and methane are most prefered for reasons of economy.

Likewise, a hydrogen stream of any purity may be diluted with additional inert gases to form the diluted hydrogen feed stream. It is only necessary that the hydrogen be substantially free of any catalyst poisons. Thus, for certain of the Group VIII noble metal catalysts it is necessary to insure that the hydrogen and diluted hydrogen-inert gas streams be substantially free of such compounds as hydrogen sulfide, sulfur dioxide, thiophene, mercaptans and the like as well as carbon monoxide. Carbon monoxide is known as a temporary poison for such Group VIII noble metal catalysts as palladium and ruthenium. Hence, if the hydrogen source exceeds about 20 parts per million of CO the CO content of the hydrogen stream is commonly reduced to 10 parts per million or less. This may conveniently be accomplished by treatment in a catalytic methanation reactor. Any readily available source of hydrogen gas is suitable for use so long as the presence of the known catalyst poisons is avoided. Such streams are commonly available in refining and petrochemical plants and can be freed of poisons by known treatments if required.

Also, the presence of oxygen or air is to be avoided during the reaction and any contact with oxygen or air by the $C_4$ hydrocarbon stream containing a high concentration of butadiene. Butadiene peroxides are known to be explosive when in dry form and can be formed by oxidation of liquid butadiene. Oxidation inhibitors such as tertiary butylcatechol are commonly employed in streams with a high concentration of butadiene, and such inhibitors are desirably present in the $C_4$ hydrocarbon stream treated by the present invention. It is also good practice to blanket any such butadiene-containing mixture with inert gas when stored. Likewise, it is preferred that a vapor pressure of inert gas be maintained when said $C_4$ hydrocarbon streams are subjected to treatment such as hydrogenation. The present invention is especially suited to this objective, since by feeding a diluted hydrogen stream containing a major proportion of such inert gas or gases the desired vapor pressure of inert gas is present at all times during the hydrogenation reaction.

The amount of such diluted hydrogen and inert gas feed charged to the hydrogenation reaction will vary with the activity and age of the particular catalyst employed, the degree of selectivity and degree of hydrogenation of the $C_4$-acetylenes desired. The process of this invention can be carried out with an amount of hydrogen ranging from 0.5 to 8 mole percent of the total $C_4$ hydrocarbon stream or in a mole ratio of .005 to .08. Preferably this amount is maintained at about 0.008 to .06 mole ratio to the $C_4$ hydrocarbons treated. If greater quantities of hydrogen are available it usually results in increased hydrogenation and loss of butadiene present and thus a decline in the selectivity of the process, even though the selectivity is still improved over that realized when charging the same amounts of undiluted hydrogen to the reaction.

The selective hydrogenation catalysts which have been found to respond best to the present invention are those supported Group VIII noble metals such as rhodium, ruthenium, iridium, palladium and platinum. Such Group VII noble metal catalysts containing from 0.01 to 1.0 percent by weight of the noble metal on a variety of supports both of relatively small and relatively large surface area have been found suitable. Certain of these catalysts respond particularly well in improved selectivity of this invention. These are generally the surface impregnated Group VIII noble metal supported catalysts, i.e. those in which the catalytic noble metal is present in a thin surface shell of the support, which are known to be particularly selective hydrogenation catalysts. However, with all the selective hydrogenation catalysts of the supported Group VIII noble metal type, improvements in the selectivity for the hydrogenation of $C_4$-acetylenes rather than of butadiene are realized. The preferred Group VIII noble metals are ruthenium and palladium. The most preferred catalysts are ruthenium or palladium surface-impregnated catalysts containing from 0.05 to 0.5 percent by weight of the metal supported on alumina.

The process of the present invention can be applied to the various $C_4$ hydrocarbon streams containing varying amounts of butadiene as well as varied amounts of $C_4$-acetylenes which it is desired to reduce by hydrogenation. Generally it is preferred to treat a stream of relatively concentrated butadiene and butylenes with small amounts of butanes and butenes and relatively small amounts of the $C_4$-acetylenes, vinyl acetylene, ethyl acetylene and methyl acetylene. A typical mixed $C_4$ hydrocarbon stream composition suitable for treatment by this invention is set out below:

| | Percent by weight |
|---|---|
| Isobutane | 3 |
| n-Butane | 3–4 |
| Butylenes | 42–48 |
| t-Butene-2 | 6–8 |
| c-Butene-2 | 4–7 |
| 1,3-Butadiene | 34–38 |
| Vinyl acetylene | 0.1–1.0 |
| Ethyl acetylene | 0.05–0.5 |
| Methyl acetylene | 0.001–0.01 |

The process of the present invention is carried out at a severity of hydrogenation sufficient to reduce the concentration of vinyl acetylene to not more than 100 parts per million and preferably to not more than 50 p.p.m., thus hydrogenating from about 95 to 99+ percent of that compound present in the mixed $C_4$ hydrocarbon feed stream. Concurrently, the concentration of ethyl acetylene is reduced to not more than 600 p.p.m. and preferably not more than 300 p.p.m., thus hydrogenating from 40 to 80 percent of that compound, while the methyl acetylene present in much smaller quantities is reduced to less than 30 p.p.m. The trace amounts of vinyl acetylene, ethyl acetylene and methyl acetylene remaining in a hydrogenated $C_4$ hydrocarbon stream can be removed from the desired butadiene product by the distillation or extraction and distillation processes to which the $C_4$ concentrate is normally subjected for the recovery of butadiene product. These compounds will concentrate in the bottom of the distillation column and be separated in this manner from the butadiene distilled overhead, with or without a previous extraction step.

The present invention is adapted for use with $C_4$ hydrocarbon streams derived from a variety of sources. One of the several advantages realized in the present process is that the hydrogenation has been found to tolerate quantities of water in the feed hydrocarbon stream which had previously been found to inactivate selective hydrogenation catalysts. With the Group VIII noble metal catalysts employed in the manner of this invention it has been found that water can be tolerated in amounts of 1 percent by weight or greater in the $C_4$ hydrocarbon feed stream with no loss of selectivity or conversion experienced. Therefore, although it is deemed good practice and desirable to provide for the separation of any entrained water from this $C_4$ hydrocarbon feed stream, it is not essential to do so.

In normal practice of the present process the gaseous portion of effluent from the top of the upflow reactor is cooled to condense any liquid product and the condensed liquid separated therefrom. The gases are then recompressed and recycled to the reactor after any inert gas and the required fresh hydrogen make-up is added to that gas stream. The liquid reaction product withdrawn in the upper portion of the reactor above the catalyst bed is combined with the liquid condensed from the overhead gases and passed to a flash tank where any remaining inert gas separates and is passed to other processing or disposed of. The liquid hydrogenated $C_4$ hydrocarbon stream from the flash tank can be subjected to any desired process for recovery of the desired butadiene product and other $C_4$ hydrocarbons. These recovery procedures, which involve precise fractional distillation or more commonly extractive distillation of the butadiene product into well-known solvents such as furfural, acetonitrile, or the like, followed by distillation thereof from the rich solvent are well-known and need not be described in detail.

After very extended periods of use in a continuous hydrogenation reaction the activity of the noble metal selective hydrogenation catalysts will be gradually reduced and likewise the selectivity thereof. When this occurs the activity and selectivity of the catalysts can be regenerated by subjecting them to any of several regeneration procedures. These include stripping with concentrated hydrogen, washing with acetone followed by hydrogen treating, and by calcining in air diluted with nitrogen or stream. The details of such regeneration procedures are known and will not be described in detail.

The manner of application of this invention is more fully illustrated in the examples set out below.

In the following examples the analysis of the feed $C_4$ hydrocarbon streams, the product hydrogenated $C_4$ hydrocarbon streams and the hydrogenating gas stream, whether or not diluted with inert gases, was done by gas chromatography. This was carried out for the reaction product stream by taking a small split stream of the reaction product at reactor outlet pressure and transmitting it directly to the sample valve of a gas chromatograph. Normally, four analyses were averaged to test one condition.

In Examples I and II the runs were conducted in a hydrogenation reactor unit constructed of stainless steel and composed of a preheater coil made of 12 feet of ¼ inch tubing which led into the bottom of the reactor comprising a 15 inch tube of either ¾ or 1.0 inch diameter. The reactor contained from 25 to 40 ml. of a

|  | Wt. percent |
|---|---|
| i-Butane | 2.6. |
| n-Butane | 3.5. |
| Butylenes | 45.5. |
| t-Butene-2 | 7.0. |
| c-Butene-2 | 5.3. |
| 1,3-butadiene | 38.8. |
| Vinyl acetylene | 0.22 (2200 p.p.m.). |
| Ethyl acetylene | 0.08 (800 p.p.m.). |

Runs were conducted at several different reactor temperatures of 60°, 80° and 120° F. and with hydrogen gas streams of varying composition from 100 percent hydrogen to quite dilute with helium as the diluent gas. The results of the various reaction conditions in terms of percent reduction of vinyl acetylene, percent reduction of ethyl acetylene and percent of total 1,3-butadiene loss by hydrogenation are set out in Table I below.

TABLE I

|  | Run 1-5 at 60° F. | | | | | Runs 6-8 at 80° F. | | | Runs 9-11 at 120° F. | | | Runs 12-14 at 120° F. | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| Pressure, p.s.i.g | 130 | 130 | 130 | 160 | 160 | 130 | 130 | 130 | 130 | 130 | 130 | 130 | 130 | 130 |
| WHSV | 12 | 6 | 15 | 12 | 9 | 15 | 12 | 18 | 30 | 30 | 30 | 19.5 | 24.5 | 24 |
| Temp., °F | 59 | 59 | 59 | 57 | 56 | 79 | 81 | 81 | 123 | 124 | 125 | 120 | 122 | 121 |
| H₂/HC moles | 0.027 | 0.027 | 0.027 | 0.027 | 0.032 | 0.027 | 0.027 | 0.063 | 0.027 | .025 | .025 | .038 | .046 | .047 |
| H₂ purity | 100 | 100 | 100 | 5.8 | 5.8 | 100 | 5.8 | 17.5 | 100 | 100 | 100 | 16 | 17.5 | 13.9 |
| Vinyl acet. reduction, percent | 99.3 | 98.2 | 99.1 | 93.3 | 97.5 | 98.8 | 95.7 | 99.5 | 99.0 | 99.0 | 98.5 | 98.4 | 98.5 | 97.0 |
| Ethyl acet. reduction, percent | 76.8 | 70.7 | 75.5 | 54.0 | 67.0 | 72.2 | 62.0 | 80.0 | 76.0 | 77.3 | 74.0 | 71.2 | 71.0 | 64.2 |
| 1,3-butadiene loss, percent | 4.1 | 4.3 | 4.0 | 1.8 | 3.1 | 4.6 | 3.0 | 3.9 | 3.9 | 3.7 | 3.7 | 2.4 | 2.8 | 2.5 | selective hydrogenation catalyst supported at the center of the reactor by alundum heat exchange balls. Both the preheater coil and tubular reactor were immersed in a constant temperature bath. Prior to each run the equipment was purged with nitrogen to exclude air. The $C_4$ fraction feed was fed by a metering pump and mixed with controlled amounts of hydrogen and, where indicated, a gaseous diluent, and thereupon passed through the preheater coil and to the bottom of the tubular reactor. The system pressure was maintained by an automatic pneumatic pressure control device. The product stream, with the exception of the small split stream directed to the gas chromatograph, was passed to a liquid gas separator at the same pressure as the reactor for separation of inert gases. Thereafter, the liquid product stream was passed through a pressure let-down valve and thence, at atmospheric pressure, to a small distillation column for separation of the gaseous $C_4$ products from any traces of oils formed in the process. The length of test runs varied from a few hours to several days.

EXAMPLE I

In this example a typical Group VIII noble metal catalyst, comprising an alumina support having a surface area of 90 m.²/g. carrying the surface-impregnated palladium in the amount of 0.3 percent by weight, was employed for hydrogenation of a $C_4$ hydrocarbon stream of the following composition.

EXAMPLE II

In this example various surface-impregnated palladium catalysts on a variety of different catalyst supports were employed in the hydrogenation of the same $C_4$ hydrocarbon stream as in Example I. Runs were conducted at generally the same conditions of 120° F. temperature except where otherwise indicated and 130 p.s.i.g. pressure in the same equipment described above. The hydrogen gas stream was varied from 100 percent hydrogen to dilutions with helium of from about 6 to 17 percent hydrogen. The results with the various catalysts in percents of reduction of vinyl acetylene, reduction of ethyl acetylene and 1,3-butadiene loss are set out in Table II below.

TABLE II

|  | A. Catalyst .3% Pd on ⅛ inch alumina cylinders, 75 m.²/g. surface area | | | B. Catalyst .3% Pd on 1/16 alumina spheres, 70 m.²/g. surface area | | | | C. Catalyst .2% Pd on alumina pellets, 10-20 m.²/g. surface area | | | | | D. Catalyst .2% Pd on Zircon, 0.05 m.²/g. surface area | | |
|---|---|---|---|---|---|---|---|---|---|---|---|---|---|---|---|
| Run | 1 | 2 | 3 | 4 | 5 | 6 | 7 | 8 | 9 | 10 | 11 | 12 | 13 | 14 | 15 |
| Temp |  |  |  | 63 | 64 | 61 | 121 |  |  |  |  |  |  |  |  |
| WHSV | 5.8 | 24.1 | 5.9 | 6 | 12 | 6 | 19 | 6 | 5.9 | 6 | 24 | 23.9 | 12 | 3 | 6 |
| H₂/HC moles | .015 | .027 | .02 | 0.48 | .027 | .047 | .027 | .027 | .027 | .027 | .027 | .019 | .027 | .027 | .027 |
| H₂ Purity | 100 | 100 | 12.2 | 100 | 100 | 6.4 | 10.7 | 100 | 100 | 12 | 10 | 7.3 | 100 | 100 | 16.7 |
| Vinyl acet. reduction, percent | 96.1 | 98.1 | 97.4 | 98.7 | 83.7 | 98.2 | 99.2 | 90.5 | 89.7 | 100 | 95.8 | 82.5 | 84.0 | 96.0 | 93.3 |
| Ethyl acet. reduction, percent | 87.7 | 68.8 | 66.0 | 79.9 | 47.3 | 58.9 | 68.6 | 61.7 | 61.5 | 81.7 | 53 | 31.8 | 44.3 | 57.0 | 50.5 |
| 1,3-butadiene loss, percent | 2.59 | 2.67 | 1.60 | 11.9 | 5.17 | 4.53 | 4.3 | 4.69 | 4.46 | 3.73 | 1.83 | 1.07 | 2.65 | 2.32 | 1.51 |

EXAMPLE III

A continuous hydrogenation system adapted for continuous operation over extended periods was constructed and hydrogenations carried out therewith. The system consisted of a shell and tube heat exchanger in the $C_4$ hydrocarbon feed line supplied with steam at 50 p.s.i.g. to the shell for preheating the $C_4$ feed stream to the desired charging temperature, a tubular constructed of carbon steel 3 inches in diameter and associated gas-liquid separation, recycling and recovery equipment. The tubular reactor was packed with ¼ inch Intalox saddles supporting a surface-impregnated palladium on alumina catalyst containing 0.3% by weight palladium on ⅛ inch x ⅛ inch alumina cylinders. The tubular reactor was provided with a bottom feed port for the $C_4$ hydrocarbon feed line and a side feed port above the bottom for the hydrogen and inert recycle gas. From the tubular reactor the reaction product was passed to a primary product liquid-gas separator at approximately the system pressure and free inert gases separated from the liquid hydrogenated $C_4$ hydrocarbon product. The liquid hydrogenated product was drawn off from the bottom of the separator, and blended with feed to a butadiene recovery unit. A small split stream was taken from the separator product stream to a gas chromatograph for analysis of the liquid hydrogenated product. Nitrogen and sufficient makeup hydrogen containing less than 10 p.p.m. of carbon monoxide to supply that consumed was added to the inert gas mixture as it was passed from the top of the separator to a recycle gas compressor to restore the gases to system pressure. Thereafter the compressed gas stream was cooled in a heat exchanger with cooling water feed and passed to a final separation vessel at system pressure where any condensed liquid product was separated and combined with the liquid product from the primary product separator. After a small split stream was directed to a gas chromatograph for analysis, the recycled gas stream was then recycled to the gas inlet port of the tubular reactor under flow control. Fresh $C_4$ hydrocarbon feed was continuously supplied to the reactor liquid inlet port on flow control.

Using the above system a continuous hydrogenation was conducted for several hundred hours. During this period an approximately stable set of conditions were maintained except for variations in the flow rate and composition of the hydrogenation gas feed, the hydrogen content thereof being varied from about 6 to about 9 mol percent hydrogen with some adjustment in the mol percent of nitrogen and butenes in the recycled gas stream. The $C_4$ hydrocarbon stream subjected to hydrogenation and the hydrogenated $C_4$ product streams had the following compositions, with the degree of variation indicated below.

| $C_4$ feed stream, wt., percent | | $C_4$ product stream, wt., percent |
|---|---|---|
| i-Butane | 2.55±0.1 | 2.52±0.07 |
| n-Butane | 3.49±0.06 | 3.50±0.06 |
| Butylenes | 45.47±0.15 | 46.15±0.12 |
| t-Butene-2 | 7.06±0.06 | 7.38±0.07 |
| c-Butene-2 | 5.35±0.07 | 5.50±0.06 |
| 1,3-butadiene | 35.85±0.05 | 34.97±0.09 |
| Vinyl acetylene | 0.2200±0.0170 | 0.0010 |
| Ethyl acetylene | 0.0785±0.0095 | 0.0220±0.0050 |

The above $C_4$ feed stream was charged to the tubular reactor at a temperature of from 90 to 95° F. The system pressure was maintained at 128±2 p.s.i.g. with the reactor inlet pressure at about 5 p.s.i.g. higher. The recycled gas stream containing added nitrogen and hydrogen was fed at a rate of approximately .02 moles of hydrogen per mole of $C_4$ hydrocarbons at a temperature of approximately 90° F. The composition of the recycled gas stream to the reactor varied within the limits given.

| | Gas to reactor, mol. percent |
|---|---|
| Hydrogen | 6.6–8.75 |
| Nitrogen | 51.10–59.20 |
| Methane | 24.70–28.75 |
| Ethane | 0.01 |
| Propane | 0.0–0.05 |
| $C_4$'s | 7.40–11.90 |

The results of the continuous stable hydrogenation reaction as determined between about 150 and 220 hours on stream are set forth in Table III below.

TABLE III

| Hours on stream | 155 | 163 | 170.5 | 187.5 | 210.5 |
|---|---|---|---|---|---|
| WHSV liquid [1] | 12.0 | 11.95 | 11.95 | 11.95 | 11.95 |
| Hydrogen mol percent in gas | 6.63 | 7.31 | 7.78 | 7.55 | 8.75 |
| Lbs./100 lbs. $C_4$ | 0.080 | 0.087 | 0.071 | 0.068 | 0.081 |
| $H_2/C_4$ mol ratio | 0.0221 | 0.0240 | 0.0196 | 0.0189 | 0.0223 |
| Makeup hydrogen: | | | | | |
| Lbs./100 lbs. $C_4$ | 0.0667 | 0.0682 | 0.0671 | 0.0671 | 0.0677 |
| $H_2/C_4$ mol ratio | 0.0184 | 0.0188 | 0.0185 | 0.0185 | 0.0187 |
| Consumed hydrogen: | | | | | |
| Lbs./100 lbs. $C_4$ | 0.0510 | 0.0552 | 0.0491 | 0.0485 | 0.0474 |
| $H_2/C_4$ mol ratio | 0.014 | 0.0152 | 0.0135 | 0.0134 | 0.0131 |
| Conversion, percent: | | | | | |
| Vinyl acet. redn | 99.6 | 99.5 | 99.6 | 99.5 | 99.5 |
| Ethyl acet. redn | 69.1 | 78.3 | 76.4 | 77.4 | 73.2 |
| 1,3-butadiene hydr | 2.4 | 2.7 | 2.2 | 2.16 | 2.28 |

[1] Pounds per hour of liquid per pound of catalyst.

As may be seen from the above table the reduction of vinyl acetylene was consistently above 99% and the loss to hydrogenation of 1,3-butadiene was below 3.0% over the period of operation and variation in hydrogen gas composition tested.

EXAMPLE IV

Additional continuous hydrogenation reactions were carried out in the same hydrogenation system as described in Example III with the exception of the size of the tubular reactor used. In this example there was employed a tubular reactor constructed of carbon steel which was 5 inches in diameter. The same 0.3 palladium on alumina catalyst described above was packed in the same manner supported above ¼ inch Intalox saddles.

Using the above described reaction system a continuous hydrogenation was conducted and sampled at 68, 188, 212, and 242 hours of operation. The conditions were maintained essentially stable with the temperature of the $C_4$ hydrocarbon stream maintained at 100° F., the gas stream fed at a temperature of approximately 85 to 90° F., and the system pressure maintained at 128 p.s.i.g. with the reactor inlet pressure at 143 p.s.i.g. The flow rate of the $C_4$ hydrocarbon feed and that of the gas stream were maintained constant, except for the last sampling period. Prior to the last sampling reported the liquid flow rate had been cut to one-half while the gas stream was increased slightly and contained somewhat less than one-half the concentration of hydrogen of the prior periods.

The compositions of the $C_4$ feed stream, the hydrogenated $C_4$ product stream and the recycled gas stream as well as the results of the hydrogenation determined from 68 to 242 hours on stream are set out in Table IV below.

TABLE IV

| Hours on stream | 68 | 188 | 212 | 242 |
|---|---|---|---|---|
| $C_4$ feed composition, wt., percent: | | | | |
| i-Butane | 2.34 | 2.57 | 2.68 | 2.55 |
| n-Butane | 3.04 | 3.32 | 3.34 | 3.19 |
| Butylenes | 45.59 | 44.93 | 45.63 | 45.32 |
| t-Butene-2 | 7.06 | 7.12 | 7.01 | 7.10 |
| c-Butene-2 | 5.30 | 5.40 | 5.21 | 5.30 |
| 1,3-butadiene | 36.44 | 36.35 | 35.83 | 36.23 |
| Vinyl acetylene | 0.2104 | 0.2221 | 0.2204 | 0.2206 |
| Ethyl acetylene | 0.0800 | 0.0855 | 0.0814 | 0.0790 |
| $C_4$ product composition, wt. percent: | | | | |
| i-Butane | 2.33 | 2.55 | 2.67 | 2.46 |
| n-Butane | 3.04 | 3.34 | 3.35 | 3.23 |
| Butylenes | 46.06 | 45.28 | 46.14 | 45.66 |
| t-Butene-2 | 7.38 | 7.39 | 7.23 | 7.48 |
| c-Butene-2 | 5.45 | 5.58 | 5.33 | 5.55 |
| 1,3-butadiene | 35.72 | 35.83 | 35.26 | 35.60 |
| Vinyl acetylene | 0.0010 | 0.0039 | 0.0017 | 0.0018 |
| Ethyl acetylene | 0.0201 | 0.0328 | 0.0292 | 0.0307 |
| Recycle gas feed, mol percent: | | | | |
| Hydrogen | 6.76 | 5.82 | 6.14 | 2.71 |
| Nitrogen | 58.96 | 62.45 | 63.99 | 65.58 |
| Methane | 25.36 | 23.72 | 28.83 | 18.22 |
| Ethane | 0.01 | 0.01 | 0.01 | |
| Propane | 0.01 | | 0.01 | 0.01 |
| $C_4$'s | 8.91 | 7.99 | 7.02 | 13.16 |
| WHSV | 9.9 | 9.9 | 9.9 | 4.95 |
| Hydrogen, mol percent | 6.76 | 5.82 | 6.14 | 2.71 |
| Lbs./100 lbs. $C_4$ | 0.0735 | 0.0631 | 0.0676 | 0.0557 |
| $H_2/HC$, mol ratio | 0.0202 | 0.0174 | 0.0187 | 0.0154 |
| Makeup hydrogen: | | | | |
| Lbs./100 lbs. $C_4$ | 0.0561 | 0.0484 | 0.050 | 0.0484 |
| $H_2/HC$, mol ratio | 0.0155 | 0.0133 | 0.0138 | 0.0133 |

TABLE IV—Continued

| Hours on stream | 68 | 188 | 212 | 242 |
|---|---|---|---|---|
| Consumed hydrogen: | | | | |
| Lbs./100 lbs. C₄ | 0.0422 | 0.0380 | 0.0395 | 0.0418 |
| H₂/HC, mol ratio | 0.0116 | 0.0105 | 0.0109 | 0.0115 |
| Conversion, percent: | | | | |
| Vinyl acet. redn | 99.5 | 98.2 | 99.2 | 99.2 |
| Ethyl acet. redn | 74.8 | 61.6 | 64.1 | 61.1 |
| 1,3-butadiene hydr | 1.95 | 1.4 | 1.5 | 1.7 |

As can be seen from the above table the reduction of vinyl acetylene was consistently above 98% while the loss of 1,3-butadiene was less than 2.0% over the period of operation tested.

EXAMPLE V

Additional continuous hydrogenation reactions were carried out in the same hydrogenation system as described in Example IV using the 5 inch diameter tubular reactor. These data represent a period of several hundred hours further use of the same catalyst charge as described in Example IV. In these runs attempts were made to conduct the hydrogenation reaction under essentially the same reaction conditions with increasingly rich hydrogen gas streams at progressively diminished flow rates.

Using the above described reaction system continuous hydrogenation runs were conducted and sampled after 650, 668, 696, 720, 742, and 766 total hours on stream. The conditions maintained essentially stable were the flow rate of the C₄ hydrocarbon feed stream at a WHSV of 8.75 at a temperature of 100° F., the flow rate gas stream diminished from the rate in Example IV at a temperature of 90° F. and the system pressure at 129 p.s.i.g. with the reactor inlet pressure of 140 p.s.i.g.

The variation in the composition of the C₄ feed stream, the hydrogenated product stream and the recycled gas stream as well as the variation in gas stream flow rates and the results of the hydrogenation determined at the indicated hours on stream are set out in Table V below.

TABLE V

| Hours on stream | 650 | 668 | 696 | 720 | 742 | 766 |
|---|---|---|---|---|---|---|
| C₄ feed comp. variables, wt., percent: | | | | | | |
| 1,3-butadiene | 36.84 | 36.70 | 36.49 | 36.36 | 36.36 | 36.56 |
| Vinyl acetylene | 0.2076 | 0.2039 | 0.1898 | 0.2004 | 0.2057 | 0.2015 |
| Ethy acetylene | 0.0770 | 0.0752 | 0.0738 | 0.0738 | 0.0736 | 0.0776 |
| C₄ product comp. variables, wt., percent: | | | | | | |
| 1,3-butadiene | 35.85 | 35.78 | 35.33 | 34.37 | 35.20 | 36.47 |
| Vinyl acetylene | 0.0029 | 0.0078 | 0.0046 | 0.0028 | 0.0328 | 0.1956 |
| Ethyl acetylene | 0.0313 | 0.0364 | 0.0327 | 0.0273 | 0.0473 | 0.0754 |
| Recycle gas feed, mol percent: | | | | | | |
| Hydrogen | 8.97 | 12.34 | 20.62 | 49.48 | 44.59 | 70.91 |
| Nitrogen | 56.84 | 48.30 | 41.62 | 10.37 | 19.21 | 23.98 |
| Methane | 25.03 | 27.53 | 24.78 | 16.87 | 18.09 | 5.05 |
| C₄'s | 9.13 | 11.80 | 12.94 | 23.24 | 17.78 | |
| WHSV | 8.75 | 8.75 | 8.75 | 8.75 | 8.39 | 8.75 |
| Gas feed (comp. to Ex. IV) | 1 | .5 | .35 | .167 | .115 | .006 |
| Hydrogen, mol percent | 8.97 | 12.34 | 20.62 | 49.48 | 44.59 | 70.91 |
| Lbs./100 lbs. C₄ | 0.114 | 0.079 | 0.099 | 0.136 | 0.089 | 0.0397 |
| H₂/HC, mol ratio | 0.031 | 0.022 | 0.027 | 0.038 | 0.025 | 0.0109 |
| Makeup hydrogen: | | | | | | |
| Lbs./100 lbs. C₄ | 0.06 | 0.06 | 0.092 | 0.15 | 0.16 | 0.054 |
| H₂/HC, mol ratio | 0.0165 | 0.0165 | 0.0254 | 0.042 | 0.044 | 0.0149 |
| Consumed hydrogen: | | | | | | |
| Lbs./100 lbs. C₄ | 0.053 | 0.05 | 0.054 | 0.090 | 0.057 | 0.0036 |
| H₂/HC, mol ratio | 0.015 | 0.014 | 0.016 | 0.025 | 0.016 | 0.0010 |
| Conversion, percent: | | | | | | |
| Vinyl acet. redn | 98.6 | 96.2 | 97.6 | 98.6 | 84.1 | 2.92 |
| Ethyl acet. redn | 59.3 | 51.6 | 55.7 | 63.0 | 35.7 | 2.82 |
| 1,3-butadiene hydrog | 2.6 | 2.5 | 3.1 | 5.4 | 3.1 | 0.22 |

As can be seen from the above table the run sampled at 766 hours failed due to total failure of the hydrogenation reaction at the rich hydrogen flow rate established. The runs sampled at 720 and 742 hours are likewise examples of inefficient selectivity of the hydrogenation indicated by high 1,3-butadiene loss in the first run and failure to fully hydrogenate the vinyl acetylene in the later run. In neither of these runs was the lowered flow rate of hydrogenating gas stream compensated for by the increased hydrogen concentration present. In the earlier runs of this series good selectivity was achieved with recycle gas composition of less than 25% hydrogen, the vinyl acetylene reduction exceeding 96% and the loss of 1,3-butadiene to hydrogenation not exceeding 3.1%.

EXAMPLE VI

A series of additional continuous hydrogenation runs were conducted in the same equipment and with the same catalyst as in Example III after the catalyst had been in use for approximately 1500 to 2000 total hours on stream. In these runs the relative amounts of methane and nitrogen were varied in the recycled gas composition fed to the reactor while all other conditions were maintained stable, including the flow rates of the liquid C₄ hydrocarbon stream and the recycled gas stream and the temperatures and pressures established.

The results of varying the recycled gas composition are set out in Table VI below in terms of vinyl acetylene in the C₄ product, percent reduction in vinyl acetylene and percent loss of 1,3-butadiene by hydrogenation.

TABLE VI

| Hours on stream | Vinyl acet. in product (p.p.m.) | Vinyl acet. redn. (percent) | Butadiene loss (percent) | Gas feed compositions [1] | | |
|---|---|---|---|---|---|---|
| | | | | H₂ mol percent | N₂ mol percent | CH₄ mol percent |
| 1,097 | 10 | 99.52 | 3.29 | 14.18 | 45.73 | 26.49 |
| 1,460 | 27 | 98.76 | 3.68 | 10.64 | 44.62 | 32.65 |
| 1,490 | 19 | 99.12 | 4.11 | 9.82 | 10.33 | 54.99 |
| 1,682 | 14 | 99.33 | 3.97 | 11.40 | 0.25 | 51.29 |
| 1,725 | 52 | 97.6 | 2.96 | 9.25 | 0.25 | 62.87 |
| 1,749 | 59 | 97.17 | 3.35 | 8.95 | 0.44 | 51.92 |
| 2,088 | 26 | 98.84 | 3.80 | 13.05 | 4.90 | 25.04 |

[1] Remainder of the gas feed composition is essentially C₄ hydrocarbons.

As can be seen there is essentially no difference in the results obtained when the hydrogenating gas is diluted with methane or largely with nitrogen. Likewise, the selectivity of the catalyst is still relatively good although the increase in butadiene hydrogenation can be attributed to the advancing age on stream of the catalyst without regeneration.

What is claimed is:

1. A process for the selective hydrogenation of C₄ acetylenes in admixture with butadiene in the liquid phase which comprises reacting said C₄ hydrocarbon mixture with a stream of hydrogen diluted to not more than 25 mole percent hydrogen in inert gas in cocurrent upflow reaction over a Group VIII noble metal supported catalyst at a temperature of from 40° to 175° F. and under a pressure sufficient to maintain the C₄ hydrocarbon mixture substantially in liquid phase, said inert gas being inert to the hydrogenation reaction and not acting as a poison to said catalyst.

2. The process of Claim 1 wherein said C₄ hydrocarbon mixture is reacted with said stream of diluted hydrogen at a temperature of from 40° to 150° F. at a pressure of from 40 to 300 p.s.i.g. and a liquid weight hourly space velocity of less than about 50.

3. The process of Claim 1 wherein said C₄ hydrocarbon mixture is reacted with said stream of diluted hydrogen at a temperature of from 70° to 140° F., at a pressure of from 80 to 200 p.s.i.g. and a liquid weight hourly space velocity of from 2 to 35.

4. The process of Claim 1 wherein the said catalyst comprises palladium on a catalyst support.

5. The process of Claim 1 wherein the said catalyst comprises from 0.01 to 1.0 percent by weight of palladium on an alumina support.

6. The process of Claim 5 wherein the said catalyst is a surface impregnated catalyst.

7. The process of Claim 1 wherein the said stream of diluted hydrogen has a hydrogen content of from 2 to 20 mole percent.

8. The process of Claim 1 wherein the inert gas is selected from the group consisting of helium, neon, argon, nitrogen, methane and ethane.

9. The process of Claim 1 wherein the said hydrogen is present in a mole ratio of from .005 to .08 to the said $C_4$ hydrocarbon mixture.

10. The process of Claim 1 wherein the said hydrogen is present in a mole ratio of from .008 to .06 to the said $C_4$ hydrocarbon mixture.

References Cited
UNITED STATES PATENTS

| | | | |
|---|---|---|---|
| 3,541,178 | 11/1970 | Nettesheim | 260—681.5 R |
| 3,634,536 | 1/1972 | Frevel et al. | 260—681.5 R |
| 3,075,917 | 1/1963 | Kronig et al. | 260—677 H |

PAUL M. COUGHLAN, Jr., Primary Examiner